US008862313B2

(12) United States Patent
Brey

(10) Patent No.: US 8,862,313 B2

(45) Date of Patent: Oct. 14, 2014

(54) SMART TRAILER RFID SYSTEM

(75) Inventor: Thomas A. Brey, Lake in the Hills, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 355 days.

(21) Appl. No.: 13/205,796

(22) Filed: Aug. 9, 2011

(65) Prior Publication Data

US 2013/0041524 A1 Feb. 14, 2013

(51) Int. Cl.

*G06K 7/10* (2006.01)
*G06F 7/00* (2006.01)
*G07C 5/08* (2006.01)
*G07C 9/00* (2006.01)

(52) U.S. Cl.

CPC .......... *G07C 5/08* (2013.01); *G07C 2009/0092* (2013.01)

USPC .......................................... 701/31.5; 701/29.3

(58) Field of Classification Search

USPC ............. 701/1, 50, 31.5, 29.3, 29.6; 340/431, 340/568.1, 568.2, 572.1, 12.51, 13.26, 10.1

See application file for complete search history.

(56) References Cited

U.S. PATENT DOCUMENTS

| | | | | |
|---|---|---|---|---|
| 7,336,159 | B2 * | 2/2008 | Fackrell et al. | 340/431 |
| 2003/0233189 | A1 * | 12/2003 | Hsiao et al. | 701/207 |
| 2006/0128023 | A1 * | 6/2006 | Waterhouse et al. | 436/56 |
| 2007/0069877 | A1 * | 3/2007 | Fogelstrom | 340/442 |
| 2008/0061963 | A1 * | 3/2008 | Schnitz et al. | 340/539.13 |
| 2009/0026263 | A1 * | 1/2009 | Schmid et al. | 235/385 |
| 2009/0079565 | A1 * | 3/2009 | MacKenzie et al. | 340/568.1 |
| 2009/0143923 | A1 * | 6/2009 | Breed | 701/1 |
| 2009/0319165 | A1 | 12/2009 | Eadie | |
| 2010/0090822 | A1 | 4/2010 | Benson et al. | |
| 2011/0148589 | A1 * | 6/2011 | Johnson et al. | 340/10.1 |
| 2011/0279253 | A1 * | 11/2011 | Suda | 340/431 |

OTHER PUBLICATIONS

International Search Report and Written Opinion dated Oct. 9, 2012, from corresponding International Patent Application No. PCT/US2012/047212.

* cited by examiner

*Primary Examiner* — Jason Holloway

(57) ABSTRACT

A smart trailer RFID system includes a vehicle such as a trailer or cargo van having one or more RFID tag readers configured to acquire load-specific data from RFID tags attached to a load. The load-specific data is collected by a computer and conveyed wirelessly to a tow vehicle. Depending on the nature of the load, the load data can be used to control or change operation of the tow vehicle or be displayed to a vehicle operator.

10 Claims, 3 Drawing Sheets

SMART TRAILER RFID SYSTEM

BACKGROUND

Trailers can carry many different types of loads. The shape of a load, its weight, center of gravity, origin and destination can change depending upon the nature of the trailer attached to a tow vehicle. A problem with prior art trailers is that they are often mismatched with the loads they carry. By way of example, a boat trailer can carry many different types of boats but while a trailer is able to carry a particular boat it may not be safe to do so. An apparatus and method for matching a load to a trailer would be an improvement over the prior art. Moreover, an apparatus and method for automatically acquiring information about a load on a trailer would also be an improvement over the prior art.

DETAILED DESCRIPTION

Figure 1:
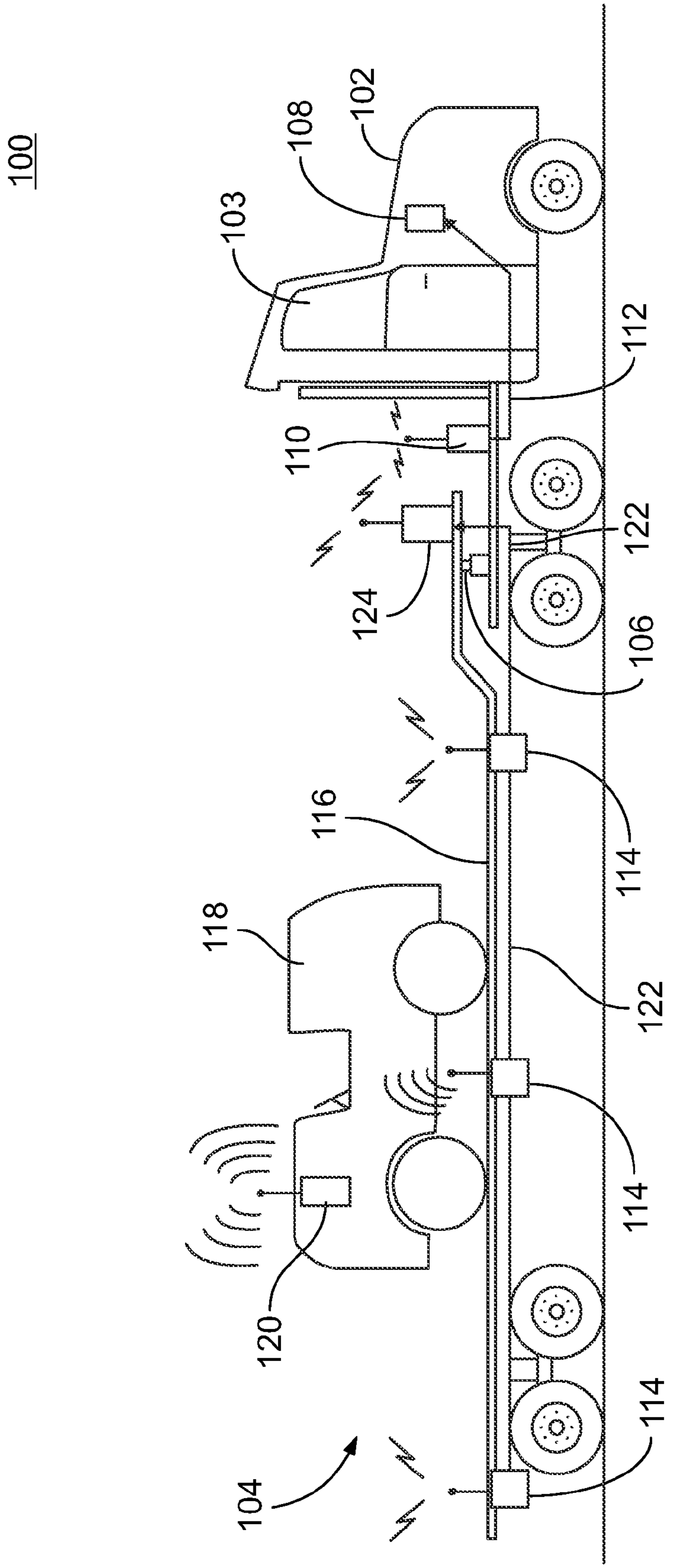
FIG. 1 depicts a smart trailer RFID system used with a tractor pulling a trailer.

FIG. 1 is a diagram of a smart trailer RFID system 100. The system 100 is comprised of a tractor 102 configured to tow an attached trailer 104. The trailer 104 is attached to tractor 102 via a conventional hitch 106.

The tractor 102 is provided with a computer 108 that is coupled to an engine control unit or ECU computer (not shown in FIG. 1) for the tractor 102 and which controls operation of the engine for the tractor 102 as well as ancillary computer systems that include anti-lock brakes (ABS) and vehicle stability control (VSC). The computer 108 receives information-bearing signals from a two-way communication radio 110, which is preferably embodied as a conventional Bluetooth transceiver. Information-bearing signals are sent from the Bluetooth transceiver 110 to the computer 108 via a bus 112, which is a set of electrically-parallel conductors used for data transfer among the components of a computer system.

The trailer 104 is conventional except that it is provided with several radio frequency identification tag (RFID) readers 114. The RFID tag readers 114 are depicted in FIG. 1 as being attached to the trailer 104 near the top of a flat, load-bearing surface 116. The trailer load 118 is depicted as a conventional pavement roller having a RFID tag 120 attached to it. The RFID tag 120 is affixed to the load 118 such that when the load 118 is on the trailer 104, the RFID tag 120 will be within RF communications distance of at least one of the RFID tag readers 114.

According to the I.E.E.E. Standards Dictionary, Copyright 2008 by the I.E.E.E., and as used herein, the terms "Bluetooth" and "Bluetooth wireless technology" describe a communications technology that was originally developed by the Bluetooth Special Interest Group (SIG). It defines a wireless communication link, operating in the unlicensed industrial, scientific, and medical (ISM) band at 2.4 GHz using a frequency hopping transceiver. The link protocol is based on time slots. WI-FI® or any other short-range wireless or radio frequency data technology can also be used.

The RFID tag readers 114 are electrically connected to a conventional Bluetooth transceiver 124 that is attached to the trailer 104 near the Bluetooth transceiver 110 for the tractor 102. Either one of the Bluetooth transceivers can be configured to operate as a Bluetooth host.

The Bluetooth transceiver 124 for the trailer 104 is connected to the various RFID tag readers 114 via a bus 122. The bus 122 thus connects all of the RFID tag readers 114 to the one Bluetooth transceiver 124 for the trailer 104.

RFID tags, RFID tag readers and the data that an RFID tag reader is able to obtain from an RFID tag are well-known. In FIG. 1, the RFID tag readers 114 and one or more RFID tags 120 on a load 118 are cooperatively located with respect to each other such that when the load 118 is placed on the trailer 104 at least of the readers 114 is able to make radio frequency contact and communicate with one of the RFID tags 120.

Data from the tag 120 is collected by one or more of the RFID tag readers 114 and provided to the Bluetooth transceiver 124 via the communications bus 122. When the two Bluetooth transceivers 124 and 110 are paired, data about the load 118 can thus be transferred from the trailer 104 to the tractor 102 for display to a driver, or to control operation of the tow vehicle/tractor 102. Bluetooth communications devices are considered to be paired after a link key has been exchanged between them, either before connection establishment was requested or during connecting phase.

Figure 2:
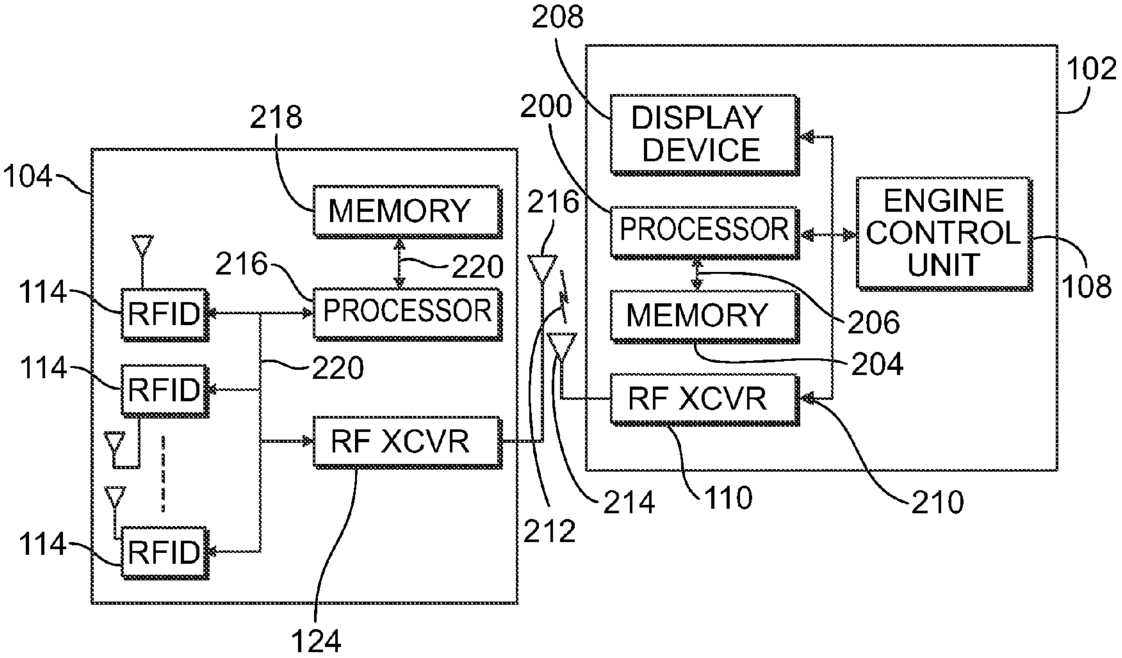
FIG. 2 is a block diagram of the smart trailer RFID system shown in FIG. 1.

FIG. 2 is a block diagram of components of a smart trailer RFID system such as the one depicted in FIG. 1.

The tractor 102 is comprised of a computer or other processor 200 which is operatively coupled to a program memory storage device 204 by way of a conventional address/data/control bus 206. The processor 200 reads program instructions in the memory 204. When those program instructions are executed, they cause the processor 200 to effectuate control over the Bluetooth transceiver 110 depicted in FIG. 1 as well as a display device 208 mounted inside the cab 103 of the tractor 102. They also cause the processor 200 to selectively communicate with an engine control unit or ECU 108 for the tractor 102.

The processor 200 communicates with the display device 208 and the Bluetooth transceiver 110 via a different, second bus 210, which also couples the processor 200 to the engine control unit 108. By sending appropriate commands and data to the ECU via the bus 210, the processor 200 is able to effectuate operation changes to the engine control unit 108 and thereby adjust or change operation of the tractor 102 responsive to information that the processor receives via the Bluetooth transceiver 110. Such changes can include but are not limited to, limiting engine speed or output, adjusting transmission shift points, adjusting anti-lock brakes (ABS) and vehicle stability control (VSC) according to the load being carried.

It is important to note that the trailer operation can also be changed by data collected from various RFID tags. By way of example, the temperature of a refrigerated container can be adjusted according to the type of food products to be kept cold. For trailers with brakes, brake actuation can be adjusted according to the weight and location of a load.

Information that the Bluetooth transceiver 110 receives and passes to the processor 200 for display or passage to the ECU comes from the trailer 104 via radio frequency signals 212 received at the antenna 214 for the trailer-mounted Bluetooth transceiver 110. Those Bluetooth RF signals 212 originate from an antenna 216 connected to the Bluetooth transceiver 124 for the trailer 104.

Load information can also be collected from the RFID tags and passed to the tractor 102. Load information can include serial numbers, ownership information, material composition, the source or origin of one or more items, shipping and destination information.

The Bluetooth transceiver 124 for the trailer 104 is controlled by a computer or processor 216 mounted on the trailer 104 but not visible in FIG. 1 due to its small size. Similar to the processor 200 used in the tractor 102, the processor 216 attached to the trailer 104 executes program instructions that are stored in a memory device 218. Those of ordinary skill in the art will recognize that the processor 216 and the memory 218 can be co-resident on the same silicon die. Such devices are commonly referred to as microcontrollers. In an alternate embodiment however, the processor 216 and the memory 218 can be on separate silicon die.

The processor 216 is coupled to the memory 218 via a conventional address/data/control bus 220. The processor thus able to read and execute program instructions stored in the memory device 218 by which the processor 216 executes control over the radio frequency ID receivers 114. Control signals are sent to and received from the RFID readers 114 via a second bus 220. The processor 216 is thus able to instruct the RFID readers 114 to read and acquire information from RFID tags within radio frequency communication range of each reader 114.

The trailer 104 and its attached Bluetooth communications device 124 are configured to obtain information from an RFID tag attached to a load, such as the load 118 depicted in FIG. 1, by reading RFID tags 120 using one or more RFID tag readers 114. The trailer 104 and its RFID tag readers 114 and its Bluetooth transceiver 124 are also configured to provide RFID tag-sourced information to a mechanically-attached tow vehicle 102. The tractor 102 adapts or changes its operation responsive to information that it obtains from the attached trailer 104 also as described in the co-pending application identified above. It can also display warnings or other messages to its operator via the tractor-located display device 208, typically embodied as a flat-panel, liquid crystal display (LCD).

Communications between the trailer 104 and its tow vehicle 102 are described in the Applicants co-pending patent application Ser. No. 13/205,791 entitled “Smart Trailer” filed herewith on Aug. 9, 2011, the contents of which are incorporated herein in their entirety.

Figure 3:
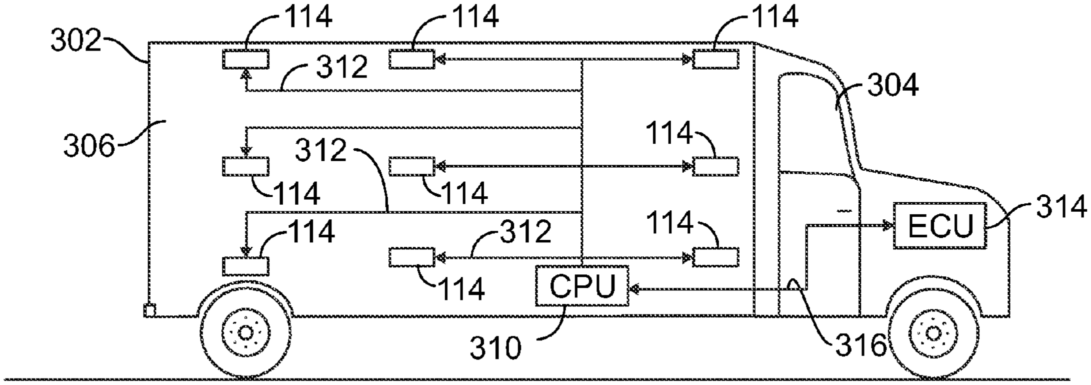
FIG. 3 is a cross-sectional view of an alternate embodiment of a smart trailer RFID system.

FIG. 3 is an alternate embodiment of a smart trailer RFID system 300 used with a panel truck 302 having a cab portion 304 permanently attached to a cargo-carrying bay 306. The cargo bay 306 is provided with several spaced-apart RFID tag readers 114, which are coupled to a CPU or controller 310 via a network 312. The CPU 310 is thus able to effectuate control over each of the RFID tag readers 114, instructing them to collect information that is obtainable from an RFID tag within radio frequency communication range of one or more of them. The computer 310 communicates with the engine control unit 314 via another bus 316 that links the two computers together but does not require or use Bluetooth or other wireless communications media.

Similar to the embodiment depicted in FIG. 1, the smart trailer RFID system 300 depicted in FIG. 3 collects data from various RFID tags attached to or contained within parcels and objects (not shown for clarity) stored within the cargo bay 306. Such information can include, but is not limited to, the weight of an object or parcel, its center of gravity, identification of where a parcel is originating from or destined to, the manufacturer or manufacture information pertaining to the parcel or the object contained therein as well as dimension information. Those of ordinary skill in the art will recognize that by locating several RFID tag readers 114 throughout a cargo bay 306 it is therefore possible to locate a parcel or object by the signal strength emitted from the RFID tag or triangulation of its location using multiple RFID tag readers 114. It is also possible to compute the center of gravity for a load by reading the weight of a parcel and determining its location in the cargo bay 306.

As with the embodiment shown in FIG. 1, operation of the truck 302 shown in FIG. 3 can also be changed in response to data obtained from RFID tags. Operation changes to the truck can include, but are not limited to, limiting engine speed or output, adjusting transmission shift points, adjusting anti-lock brakes (ABS) and vehicle stability control (VSC) according to the load being carried.

Figure 4:
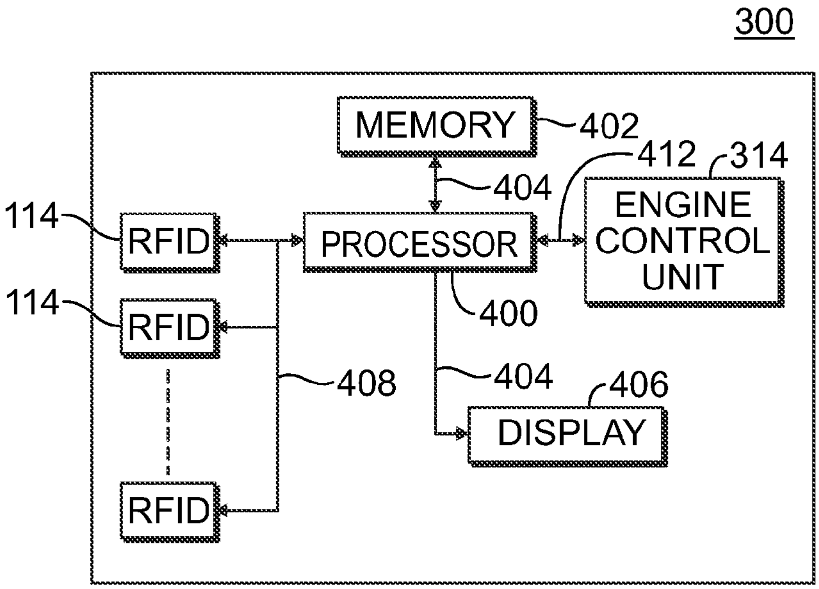
FIG. 4 is a block diagram of the smart trailer RFID system used with the truck depicted in FIG. 3.

FIG. 4 is block diagram of the smart trailer RFID system depicted in FIG. 3. A conventional processor 400 is coupled to a memory device 402 via a conventional address/data/control bus 404. Program instructions stored in the memory device 402, when executed, cause the processor 400 to effectuate control over a display device 406 mounted in the cab portion 304 and display information-bearing messages to the operator of the vehicle.

The processor 400 also executes control over the several RFID tag readers 114 via a bus 408 similar to the bus 220 described above.

Information that the processor 400 obtains from the RFID tag readers 114 can thus be displayed to the operator or provided to an engine control unit 314 via another bus 412 that links the ECU 314 to the processor 400.

Those or ordinary skill in the art will recognize that the smart trailer RFID system depicted in FIGS. 3 and 4 enable one or more radio frequency identification tag readers 114 which are coupled to the processor 400 to wirelessly obtain information from a RFID tag on one or more parcels or objects within the cargo bay 306. That information can thus be passed directly to the engine control unit 314 from the truck 300 or displayed on a display device 406 for the operator. The information that can be obtained from an RFID tag in the cargo bay 306 includes but is not limited to the parcel or objects weight, its center of gravity, identification information that might include a serial number, ownership, material composition, source or origin, shipping destination, make model year and so forth. It can also include license information and registration information such as motor vehicles when transported by the truck.

The information provided to the engine control unit 314 can be used by the ECU to change its operation or the operation of other systems on the vehicle 300. The ECU 314 can thus change or adjust a breaking system or vehicle stability control by sending signals to the appropriate computers for those systems, all of which are well-known in the art.

Figure 5:
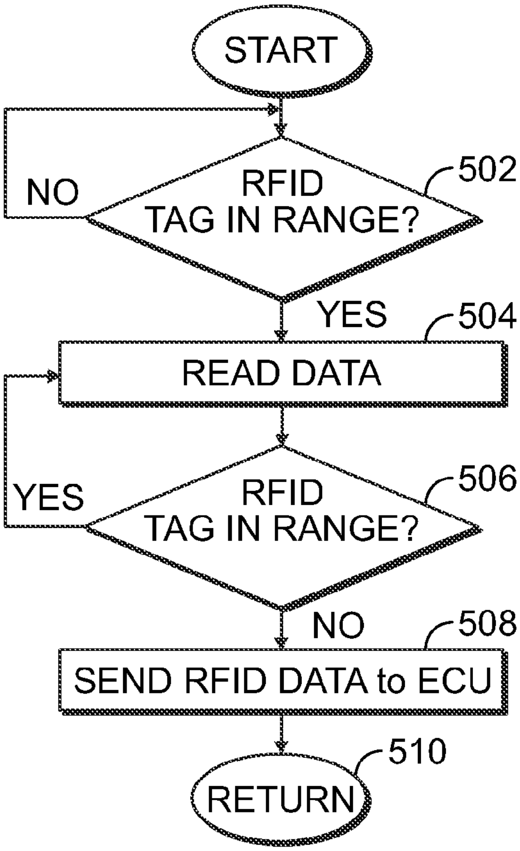
FIG. 5 is a flowchart depicting steps of a method of using a smart trailer RFID system.

FIG. 5 depicts steps of a method of operating a vehicle using a smart RFID tag system, such as the systems shown in FIGS. 1-4. As an initial step 502, a determination is made whether an RFID tag is within range of one or more of the RFID tag readers described above. If an RFID tag is determined to be within range, information from the tag is read at step 504. Other tags that might be within range of an RFID tag reader are also read at step 506 and 504 until the last tag and its information have been obtained.

At step 508, all of the RFID-collected data is sent by the processor controlling the tag readers to an engine control unit or other computer operating either a tow vehicle or in the case of a panel truck the ECU for the engine. The method continues at step 510 by continuously scanning RFID tag readers for the presence or absence of RFID tags.

In an alternate embodiment of the system shown in FIGS. 1 and 2, RFID-tag data is transferred from the trailer 104 to the trailer 102 via a conventional, hard-wired cable.

The foregoing description is for purposes of illustration only. The true scope of the invention is set forth in the appurtenant claims.

What is claimed is:

1. A vehicle, which is configured to tow a trailer carrying a load, the vehicle comprising:

a control computer for the vehicle, the control computer configured to control an operation of the vehicle;

a processor operatively coupled to the control computer unit via a bus;

a memory device coupled to the processor and storing program instructions, which when executed by the processor, cause the processor to provide load information to the control computer, the load information provided to the control computer causing the operation of the vehicle to change;

a communications device coupled to the processor, the communications device receiving load information from a radio frequency identification (RFID) tag reader and providing said load information to the processor, the RFID tag reader being configured to obtain information from a RFID tag attached to a load carried by a trailer that is towed by the vehicle, wherein the control computer is configured to adapt operation of the tow vehicle, responsive to the load information received from the communications device, in at least one way selected from: limiting engine speed; adjusting transmission shift points; adjusting anti-lock brakes; and adjusting vehicle stability control.

2. The vehicle of claim 1, wherein the communications device is configured to provide information obtained from the RFID tag reader to at least one of:

an engine control unit (ECU);

a vehicle braking system control computer; and a vehicle stability control computer.

3. A trailer, configured to carry a load and be towed by a tow vehicle having a control computer, the trailer comprising:

a processor;

a trailer communications device coupled to the processor, the trailer communications device configured to transmit an information-bearing signal to a tow vehicle communications device attached to the tow vehicle and which is coupled to the control computer for the tow vehicle, the transmitted information-bearing signals having information about the load on the trailer; and a plurality of radio frequency identification (RFID) tag readers operatively coupled to at least one of the processor and the trailer communications device and configured to wirelessly obtain load information from a radio frequency identification tag attached to a load on the trailer;

a memory device coupled to the processor, the memory device storing executable program instructions for the processor which when executed cause the processor to control the trailer communications device to transmit said information-bearing signals to the tow vehicle communications device, the transmitted information about the load causing the control computer for the tow vehicle to change an operation of the tow vehicle in at least one way selected from: limiting engine speed; adjusting transmission shift points; adjusting anti-lock brakes; and adjusting vehicle stability control.

4. The vehicle trailer of claim 3, wherein the plurality of RFID tag readers are configured to wirelessly obtain load information from a RFID tag attached to a load on the trailer.

5. The trailer of claim 4, wherein information obtained from an RFID tag comprises at least one:

location of an object on the trailer, to which an RFID tag is attached;

weight information for an object on the trailer to which an RFID tag is attached;

center of gravity location information for an object on the trailer, to which an RFID tag is attached;

identification information for an object on the trailer to which an RFID tag is attached;

manufacture information for an object on the trailer to which an RFID tag is attached; and dimension information for an object on the trailer to which an RFID tag is attached.

6. The trailer of claim 3, wherein the trailer communications device is configured to transmit information obtained from at least one of the plurality of RFID tag readers.

7. The trailer of claim 3, wherein the control computer for the tow vehicle is at least one of:

an engine control unit (ECU);

a braking system control computer;

a vehicle stability control computer.

8. The trailer of claim 3, wherein the trailer communications device is configured to provide information obtained from at least one of the plurality of RFID tag readers to a mechanically attached tow vehicle, configured to adapt its operation responsive to information obtained from at least one of the RFID tag readers.

9. The trailer of claim 3, wherein the communications device is configured to provide information obtained from at least one of the plurality of RFID tag readers to at least one of:

a tow vehicle engine control unit (ECU);

a tow vehicle braking system control computer;

a tow vehicle stability control computer.

10. A method of operating a tow vehicle comprising:

obtaining load information from a RFID tag attached to a load on a trailer that is attached to the tow vehicle;

sending the load information obtained from the RFID tag to an engine control unit for the tow vehicle; and adapting operation of the tow vehicle responsive to load information received from the RFID tag, wherein the step of adapting operation of the tow vehicle comprises at least one of: limiting engine speed; adjusting transmission shift points; adjusting anti-lock brakes; and adjusting vehicle stability control.

* * * * *